United States Patent

[11] 3,579,229

[72] Inventor Robert W. Tripp
Tuckahoe, N.Y.

[21] Appl. No. 771,748
[22] Filed Oct. 30, 1968
[45] Patented May 18, 1971
[73] Assignee Inductosyn Corporation
Carson City, Nev.

[54] PRECISION SWITCHING NETWORK FOR A DIGITAL TO ANALOG CONVERTER
9 Claims, 2 Drawing Figs.

[52] U.S. Cl. .......... 340/347DA, 318/632
[51] Int. Cl. .......... H03k 13/04
[50] Field of Search .......... 340/347; 324/119, 131; 328/162; 323/44, 22 (SCR); 325/473; 328/164, 172; 318/632

[56] References Cited

UNITED STATES PATENTS

| | | | |
|---|---|---|---|
| 3,158,738 | 11/1964 | Pfeiffer .......... | 340/347X |
| 3,304,487 | 2/1967 | McCaskey .......... | 323/22X |
| 3,487,292 | 12/1969 | Tibbetts .......... | 323/22 |

*Primary Examiner*—Thomas A. Robinson
*Assistant Examiner*—Michael K. Wolensky
*Attorney*—William E. Beatty ABSTRACT: A system for converting a digital number such as an angle into analog signals representing the sine and cosine of the angle including a plurality of network stages representing binary bits of 360°. A control activates certain stages whereby the sum of the corresponding bits represents the selected angle. The stages of major significance include inputs and transformers for generating output signals to serve as inputs to the stages of minor significance, such output signals being computed by stages in tandem operating in accordance with equations 1 and 2, column 3 of U.S. Pat. No. 2,849,668. The stages of minor significance operate in accordance with the following equations 3 and 4 of the above patent:

$$\sin(a+b)=\tan b\cos a+\sin a \quad (3)$$
$$\cos(a+b)=\cos a-\tan b\sin a \quad (4)$$

In equation 3 the term "cos a" is the output of the last stage of major significance, the term "tan $b$" being a first transformer having a primary winding common to all of the stages of minor significance, the first transformer having a secondary winding individual to each stage of minor significance, the secondary windings connected in series, each secondary winding being activated by a transistor circuit, and the active secondary windings supplying an output to a second transformer. The first transformer has a turns ratio increasing its binary bit value by a certain factor and the second transformer decreases the output by the same factor whereby the signal proportional to "tan $b$ cos $a$" in the secondary winding of the second transformer is restored to normal prior to being combined with the signal "sin $a$" from the stages of major significance to form the final sine output. A similar transformer and secondary winding arrangement is provided for the signal according to "tan $b$ sin $a$" for equation 4 prior to algebraic summing with the term "cos $a$" from the stages of major significance to form the final cosine output.

INVENTOR
ROBERT W. TRIPP

INVENTOR
ROBERT W. TRIPP

PRECISION SWITCHING NETWORK FOR A DIGITAL TO ANALOG CONVERTER

The invention herein described was made in the course of or under a contract, or subcontract thereunder, with the United States Department of Navy.

BACKGROUND OF THE INVENTION

1. Field of the Invention

This invention relates to digital to analog converters and more particularly to such converters having high accuracy by reducing the effects of variations in impedances introduced by switching devices of the converter.

2. Description of Prior Art

Switches are used in certain types of converters for converting a digital number into an analog signal. The number of switches required depends on the number of binary bit positions, or stages of the converter. Input voltage levels are modified at each succeeding stage if the stage is actuated. By combining the voltage levels from preceeding stages with the modified levels computed by the stages, analog signals representing trigonometric functions are produced.

In a binary device the stages representing angles are related by succeeding powers of two. As a result, the signal levels added for the least significant bit positions are relatively low. The largest level is assigned to the most significant bit positions and the smallest level is assigned to the least significant bit position. Sometimes it is difficult to distinguish between noise and the smaller signal levels.

In a typical converter, a 360° circle is divided into a number of parts with each division being represented by a stage of a converter. The number of parts represented by the stages represents the total number of parts into which the circle is divided. In a fifteen stage converter, for example, the fifteenth stage would represent one part in $2^{15}$ parts of the circle. Stated alternately, the fifteenth stage represents an increment of 360° divided by 32,768 or approximately 40 sec. of arc.

Each stage of the converter represents one bit of the digital number and a discrete angle. Where a logic one appears, the associated stage is actuated for computing a signal representing a trigonometric function of the angle represented by the stage. The signal is algebraically added to the signals from preceding stages. If a logical zero appears at a bit position, the stage is bypassed.

The digital number to be converted is represented as a series of binary ones or zeros in the stages of the converter. By generating signals as a function of that number, the number can be converted into analog signals usable, for example, in a machine tool positioning system.

If ideal switching devices were available, the changes in signal levels would not be a problem. For example, if relatively high speed switching devices having zero impedance when "on" and infinite impedance when "off" were available, the signals could be processed without difficulty. However, state of the art switching devices are not ideal. Although solid state devices, such as transistors, provide a satisfactory switching speed, the devices do not have the required zero and infinite impedance.

As a result, the level of a signal representing the trigonometric function of a particular angle may be dropped across the impedance of the transistor and therefore cause the final analog signal to be in error by that amount. Similarly, leakage may occur through a transistor at a particular bit position and cause a change in the final analog signal. Noise may also cause errors.

In order to achieve a precise conversion from a digital number to an analog signal, the impedance effects must be reduced. The present invention provides a means for dealing with the problem described.

BRIEF SUMMARY OF INVENTION

The invention comprises a plurality of switching networks which are used as stages of a digital to analog converter corresponding to bit positions of a digital number being converted. At least one of the networks includes signal increasing means for increasing the signals to be computed by that stage a certain amount and signal decreasing means for decreasing the computed signals a corresponding amount prior to being algebraically summed with the input signals to the network. As a result, signals computed by the network are relatively unaffected by the conducting and nonconducting impedances of the network. The decrease is necessary in order to restore the correct relationship between that signal and signals from other stages.

In a preferred embodiment, increasing and decreasing means are provided for a plurality of switching networks representing the least significant bit positions of a converter. The increasing and decreasing means can also be provided for all stages of a converter if desired.

Since the voltage levels of signals computed by the least significant stages are of relatively lower magnitudes, it is convenient to use the corrective means described herein with those stages. It is less convenient for use with the more significant stages since the voltage levels involved are of substantially greater magnitude and switching difficulties are introduced.

Therefore, it is an object of this invention to provide a digital to analog converter having switching networks with improved characteristics.

It is still a further object of this invention to provide a switching network usable in a digital to analog converter for reducing impedance effects of the network on converter signal levels.

Still another object of this invention is to provide in relatively high-speed switching networks means for manipulating signals through selected bit positions of the networks to reduce impedance effects.

Still a further object of the invention is to provide switching devices in networks for precisely converting data representing the least significant bit positions of a digital number into analog signals.

These and other objects of the invention will become more apparent when taken with the detailed description of the drawings, a brief description of which follows.

DESCRIPTION OF PREFERRED EMBODIMENT

Figure 1A:
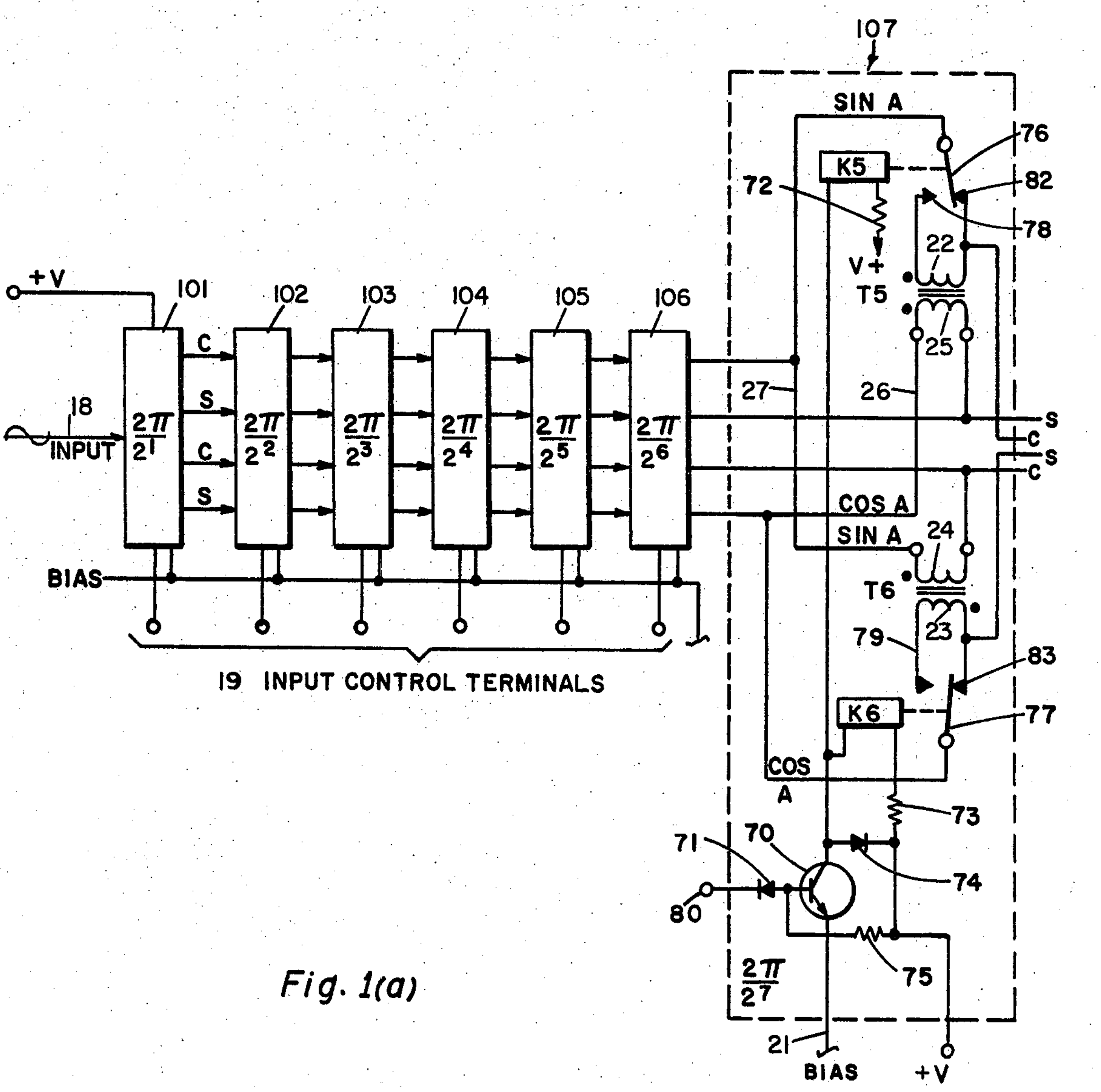
FIG. 1*a* schematically illustrates the first seven stages of a 15 stage converter.
Figure 1B:
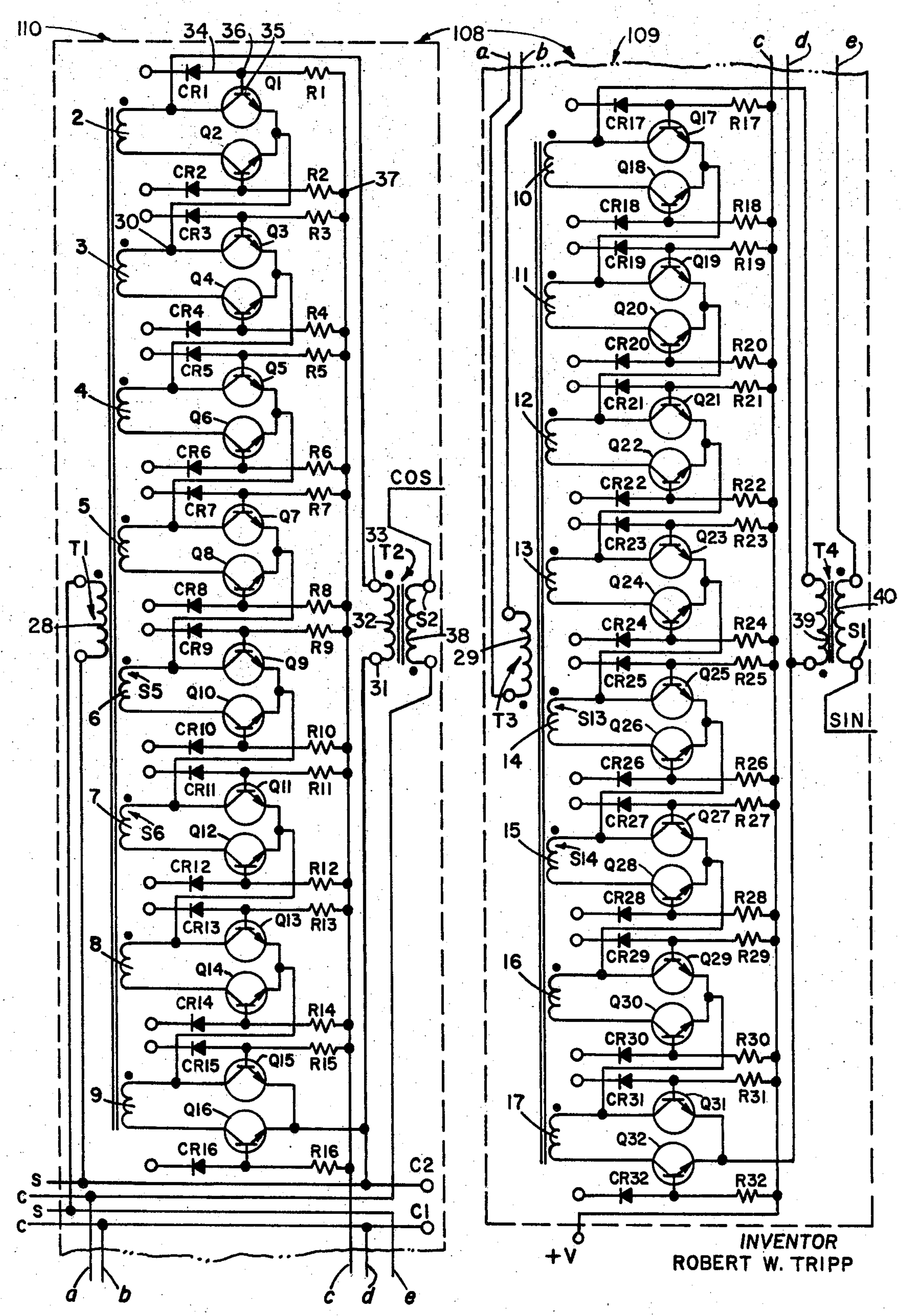
FIG. 1*b* schematically illustrates the least significant bit positions for the last eight stages of the converter.

FIG. 1*b* shows switching network 1 comprising transistor switches Q1 to Q32 representing digital to analog converter stages for the least significant eight bit positions of a number represented in binary form. The embodiment system comprising 15 stages converts digital numbers into analog signals having a sine and cosine trigonometric relationship. The first seven stages are indicated at 101 to 107 in FIG. 1*a*, the last eight stages being indicated at 108 in FIG. 1*b*.

The signals are computed by the significant stages of the system, for example, stages 101 through 103, in accordance with the following trigonometric formulas:

$$\text{Sin}(A+B) = \sin A \cos B + \cos A \sin B \quad (1)$$

$$\text{Cos}(A+B) = \cos A \cos B - \sin A \sin B, \quad (2)$$

where A represents angles in the form of signals combined by prior stages and B represents the angle in the form of a signal computed at a particular stage. Voltages corresponding to the product terms (in the above equations) may be obtained by means of transformers such as the transformers shown and described in U.S. Pat. No. 2,849,668 issued on Aug. 26, 1958, and entitled, "Automatic Machine Control," Robert W. Tripp, inventor.

For example, a voltage equal to sine A may be applied to the primary of a transformer at a particular stage. Similarly, a voltage equal to cosine A would be applied to the primary of another transformer. Taps would be provided at the secondaries of the transformers for selecting voltages equal to cosine B and sine B. By appropriately connecting the sine and cosine windings at the secondaries of the transformers, output signals equal to the products illustrated by the above equations would result. The plus and minus values for the terms are obtained by appropriate selection of leads from the transformer windings.

If the right-hand side of each of the above equations is divided by Cos B, the following equations result:

$$\frac{\sin(A+B)}{\cos B}=\sin A+\cos A\tan B \qquad (3)$$

$$\frac{\cos(A+B)}{\cos B}=\cos A-\sin A\tan B \qquad (4)$$

Where the angle B is small, as in the least significant stages indicated at 108, the signals may be computed in accordance with equations 3 and 4 without regard for the 1/Cos B gain term. Since the equations are in terms of sine and cosine ratios, the accuracy of the computations is not affected.

Although not necessary, for many applications it may be desired to provide networks in which the gain term is not included. Such networks are described and shown in U.S. Pat. application Ser. No. 704,900, by Robert W. Tripp, for Sine-Cosine Computer Networks, filed Feb. 12, 1968.

It should be noted that although a 15-stage converter is shown, converters having a greater or lesser number of stages than the illustrated embodiment can also be used. In addition, although a series connected converter is shown, converters in which the stages are parallel connected are also within the scope of the invention. Details for interconnecting the switches to implement either type of converter are within the abilities of persons skilled in the art.

Although a binary device is described, it should be understood that the invention is equally applicable to other numbering systems such as decimal, or binary coded decimal.

For convenience, stages one through six are shown in block diagram form at 101 to 106. An input 18 is shown at stage 101. The signal level used as an input is modified by each actuated stage. In addition, input control terminals 19 are shown for controlling relays associated with each stage. The terminals 19 may be grounded or be connected to a voltage level. Voltage source +V is connected to the input of each stage.

The most significant stages, i.e., where the angle B is relatively large, can be implemented as described previously and shown and described in the referenced U.S. Pat. No. 2,849,668.

One embodiment of a circuit network which can be used as one of the stages representing smaller angles of the system is shown in block diagram form as the seventh or $\pi/64$ stage 107 in FIG. 1*a*, $\pi/64$ being equivalent to $2\pi/2^7$ as shown in FIG. 1*a*. The particular circuit shown implements equations 3 and 4 previously described. The network of stage 107 is shown in a bypassed mode.

The seventh stage 107 comprises relays K5 and K6 controlled by transistor 70. Diode 71 is connected to a voltage source for actuating transistor 70 in accordance with its corresponding binary bit. Stages 101 through 106 have similar input lines indicated at 19 to diodes or the like, for actuating transistor devices in accordance with their corresponding binary bit positions. When the transistor is on, voltage from voltage source +V energizes the relays like K5, K6.

Resistors 72 and 73 with diode 74 regulate the level of voltage placed across the relays K5, K6. Resistor 75, in series with source +V and the base of transistor 70, limits the current into the base of the transistor 70 when diode 71 is turned off.

Bias lines like 21 are connected to each network so that the network can be biased to switch between positive and negative voltages.

The relays K5, K6 control the position of arms 76 and 77. When the relays are energized, arms 76 and 77 are pulled into contact with terminals 78 and 79 respectively. As a result, the secondary windings 22, 23 of transformers T5 and T6 are connected with secondaries of other transformers in the converter for combining signals according to the formulas previously indicated. When the relays K5, K6 are deenergized, the arms 76, 77 are in contact with terminals 82 and 83 and the windings are bypassed.

If, for example, a binary one appeared at the seventh bit position of a digital number to be converted, the relays K5, K6 would be energized and the seventh stage 107, or network, would be included in the overall system circuit. The transformer secondaries like 22, 23 would be connected in the circuit with other stages of the converter where a one appeared in the corresponding bit position.

Signals from stage 106 comprising the sine and cosine of an angle A would be supplied to the primary windings 24, 25 of transformers T6 and T5 respectively. A signal proportional to the cosine of angle A is impressed via line 26 across the primary 25 of T5. A sin A signal is similarly impressed via line 27 across the primary 24 of T6. The turns ratio of T5 and T6 is equal to tan B. As a result, the voltage across the secondary 22 of T5 is cos A tan B which is added to sin A, impressed to produce a signal in accordance with equation 3. Similarly, the voltage across the secondary 23 of T6 is sin A tan B which is subtracted from cos A, impressed across the secondary from a preceding network, to produce a signal in accordance with equation 4.

The output signals S, S and C, C would be used as shown in FIG. 1*b* as inputs to the primary windings 28 and 29 of transformers T1 and T3.

The eighth through the fifteenth stages indicated at 108 represent the $2^8$ through the $2^{15}$ bit positions for the embodiment shown and includes transformers T1 and T3. For purposes of this description, the eighth through the fifteenth stages indicated at 108 are used to illustrate the least significant bit positions of the converter having inputs and outputs which are modified as described herein. It should be understood that the invention could be used with a greater or lesser number of stages depending on the resolution and accuracy of a particular system. The sine and cosine sections of the eighth through the 15th stages are shown in FIG. 1*b* in the broken line blocks 109 and 110, respectively, the lead lines *a* to *e* at the bottom of section 110 continuing as indicated at the top of section 109.

The transformers each include a primary winding having a number of turns and secondary windings 2 through 9 and 10 through 17 for transformers T1 and T3 respectively. The secondary windings each have a number of turns proportional to the tangent of the angle represented by the stage.

Terminals of the secondary windings for each stage are connected to collectors of transistor pairs Q1, Q2 through Q31, Q32. For example, the terminals of secondary winding 2 are connected to the collectors of Q1 and Q2.

The emitters of each of the transistor pairs are connected together and the resulting emitter junctions of each stage are connected to succeeding stages.

The emitter junctions of the eighth stage, comprising transistors Q1 and Q2, are connected to the collector of transistor Q3 of the ninth stage. The collector is also connnected to one terminal 30 of secondary winding 3. The emitter junctions of succeeding stages are similarly connected with the exception of the 15th stage. The emitter junctions of transistors Q15 and Q16 (for the cosine portion) are connected to one terminal 31 of primary winding 32 for transformer T2. The other terminal 33 of the winding 32 is connected to the collector of Q1 for the eighth stage to complete the circuit.

One electrode like 34 of diodes CR1 through CR32 is connected to the baselike transistors Q1 through Q32 respectively and to one terminal like 36 of resistors R1 through R32 respectively. The resistors are connected at their other terminals like 37 to line C which is connected to voltage source, +V. The other electrodes of the diodes are connected to a control source (not shown). Each diode can be turned on and off independently.

For this example the sine and cosine input signals to the transformers T1 and T3 have a maximum amplitude of 10 volts corresponding to an angle. Although the amplitudes of the sine and cosine signals change as a function of the angle involved, the vector sum of the amplitudes remains constant except for the presence of the gain term in the stages computing the signals in accordance with equations 3 and 4.

An actual step down turns ratio for the T5 and T6 transformers of the seventh stage 107 is 224 turns to 11 turns. The eighth stage indicated at 108 would normally have a ratio of 448 turns to 11 turns, so that the voltage would be reduced by an additional power of 2. Therefore, the input signal would be reduced by a factor of 0.02454. The voltage to the other stages would be reduced in proportion to the change in the turn ratios for each stage indicated at 108. As a result, the voltage for the 15th stage would be substantially reduced. If the leakage current through the devices is relatively high or if the impedance drop through the devices is high when the devices are turned on, the final analog signal could be in error. An additional error could also be caused by the variation of coupling impedance in the device.

Therefore, instead of using turns ratios which are changed in accordance with succeeding power of 2 from a preceding stage, turn ratios are used at transformers T1 and T3 to increase by a certain factor the voltage levels of signals through the least significant stages 108. Subsequently, the voltages are reduced at transformers T2 and T4 by the same factor to restore the level.

For example, instead of using the turns ratio indicated above, the eighth stage indicated at 108 is arranged in the ratio of 224 turns to 128 turns. The signals are then mixed through a step down transformer having a ratio of 171 turns to 8 turns so that the net effect on the signal remains unchanged. Voltages switched in the eighth stage indicated at 108 are therefore more than 20 times higher than would normally be the case.

Since the turns ratios at the inputs to the stages were increased from ratios related binarily, to the signals from prior stages, the ratios at the outputs must decrease the signals by the same amount. Turns ratios for the output transformers (T2 and T4) must be selected so that the product of the turns ratio for each stage and the output ratio equals the original turns ratio.

For example, assuming that the turns ratio at the eighth stage indicated at 108 was originally 10/200 (instead of the values shown) and was increased to 100/200, an output ratio of 1/10 would provide the necessary compensation for the increase. It would also compensate for increases at the succeeding stages so that the signals inductively coupled between the windings of the output transformer would have the correct levels for the stages represented.

It should be noted that the addition of the transformers for increasing and decreasing signals through a stage provides additional degrees of freedom in establishing the desired ratios of the computed signals. That is, instead of being able to adjust only transformer ratios of the network transformers previously used in computing the analog signals, the added transformers provide additional means for adjusting the ratios.

The transformers provide a means for algebraically summing the combined analog signals from the prior stages with the combined analog signals from the least significant stages. Signals from the least significant stages 108 are summed by the series connection of the secondaries 2 to 9 in the cosine section and by the series connection of the secondaries 10 to 17 in the sine section. The sum of the signals in the secondaries 2 to 9 is supplied to primary winding 32 of transformer T2, that sum inductively appearing in the secondary winding 38 for combination with a signal corresponding to "Cos A" in equation 4 on line C from the preceding stages 101 to 107 of major significance. The sum of the signals in the secondaries 10 to 17 is supplied to primary winding 39 of transformer T4, that sum inductively appearing in the secondary winding 40 for combination with a signal corresponding to "Sin A" in equation 3 on line S from the preceding stages 101 to 107 of major significance. The final sine analog signal appears across output terminal S1 of transformer T4 and terminal C2 of transformer T2. The final cosine analog signal appears across output terminal S2 of transformer T2 and terminal C1 of transformer T4. It is possible to algebraically sum the signals computed by the least significant stages since the tangent is linear for the relatively small angles involved.

One example of the operation of the system can be given by assuming a digital number of 000001000001100 (5.748°) is to be computed into analog signals representing sine and cosine functions.

The sixth stage 106 would be actuated and would provide signals proportional to the sine and cosine of the angle $2\pi/2^6$ (5.62°) at the primary windings 28 and 29 of transformers T1 and T3, respectively. Stage 12 indicated at 108 is turned on by turning transistors Q10 and Q26 on, and by turning transistors Q9 and Q25 off. Stage 13 indicated at 108 is turned on by turning Q12 and Q28 on and Q11 and Q27 off. All the other even numbered transistors are turned off and the other odd numbered transistors are turned on to make the other stages inactive. As a result, transformer secondaries S5 and S6 would be connected in series across the primary 32 of transformer T2. Secondaries S13 and S14 would be connected in series across the primary of transformer T4. The other secondaries would be bypassed.

The signals from the 12th and 13th stages indicated at 108 representing the sine and cosine of angles $2\pi/_{2}12$ and $2\pi/_{2}13$ respectively would be summed in the primaries of T2 and T4 and would be combined with the signals from stage 106 in the secondaries of T2 and T4 to satisfy the trigonometric formula previously described (equations 3 and 4). The output analog signals at the secondaries connected as shown are proportional to the sine and cosine of the angle represented by the digital number converted.

Although the invention has been described and illustrated in detail, it is to be understood, that the same is by way of illustration and example only, and is not to be taken by way of limitation. The spirit and scope of the invention is limited only by the terms of the appended claims.

I claim:

1. A system for converting a digital number into analog signals representing trigonometric functions comprising,
   a plurality of networks representing successive bit positions of said digital number with each bit position representing an angle, each of said networks including means for generating output signals having amplitudes proportional to trigonometric functions of the sums of the angle of a particular network and all angles of previous networks as a function of the logic states of said networks, and
   means for increasing the amplitude of signals into selected networks by a certain ratio for reducing impedance effects of the networks on the signals used in generating said trigonometric functions, including means for decreasing the signals from said networks by said ratio prior to summing said signals with signals from the preceding networks for producing said analog signals.

2. The combination recited in claim 1 wherein said means for generating include means for generating signals representing sine and cosine trigonometric functions of the sum of the angles of all networks as a function of the logic states of said networks.

3. The combination recited in claim 1 wherein said selected networks represent the least significant bit positions of said system, and said means for decreasing includes means for summing signals from certain of said selected networks as a function of the logic state of said networks.

4. The combination as recited in claim 3 including means for algebraically summing said summed signals with the input signals to said networks for generating analog signals representing the trigonometric functions of the angle represented by the digital number being converted.

5. The combination as recited in claim 1 wherein said means for increasing comprises transformer means having a primary winding connected to receive signals from the networks of major significance and a secondary winding for each of said selected networks, said primary and secondary windings having turns ratios for increasing the level of the signals from said secondary windings by a common ratio in excess of the bit position value.

6. The combination as recited in claim 1 wherein said means for decreasing includes means having a primary winding connected to receive signals from active ones of said selected networks as a function of the logic states of said networks and a secondary winding having turns ratio relative to the primary winding for decreasing the level of the summed signals by a ratio equal to the increase in the signal levels into the network whereby the signals generated by said networks have the correct signal levels, and means for summing said correct signal levels with the input signals to said network.

7. The combination as recited in claim 1 wherein said means for increasing comprises first transformer means having a primary winding connected to receive signals from the networks of major significance and a secondary winding for each of said selected networks, said primary and secondary windings having turns ratios for increasing the level of the signals from said secondary windings by a common ratio in excess of the bit position value, and said means for decreasing includes second transformer means having a primary winding connected to receive signals from active ones of said selected networks as a function of the logic states of said networks and a secondary winding having a turn ratio relative to the primary winding for decreasing the level of the summed signals by a ratio equal to the increase in the signal levels into the network whereby the signals generated by said networks have the correct signal levels, and means for summing said correct signal levels with the input signals to said network.

8. A system for converting a digital number into an analog signal representing a trigonometric function of an angle proportional to said number, said system including a plurality of networks, each network receiving an input signal, each network having a logic state controlled by a different bit position of said digital number, each network operative as a function of said logic state to form said analog signal with an amplitude proportional to a trigonometric function of an angle defined by said network and of an angle represented by the input signal, the improvement comprising, means for increasing by a factor the amplitude of signals into selected ones of said networks for reducing impedance effects, and means for decreasing the signals from said selected ones of said networks by said factor prior to thus forming said analog signal.

9. A system for converting a digital number representing an angle into sine and cosine valves of the angle including a plurality of network stages representing binary bits of 360°, certain of said stages being of major significance and others of minor significance, said stages of major significance including inputs and transformer means for generating preliminary output signals to serve as inputs to said stages of minor significance, such output signals being computed from said inputs and transformer means by stages in tandem operating in accordance with the following equations 1 and 2:

$$\sin(a+) = \sin a \cos b + \cos a \sin b \quad (1)$$

$$\cos(a+) = \cos a \cos b - \sin a \sin b \quad (2)$$

the improvement wherein said stages of minor significance include electrical analogs of the terms of the following equations 3 and 4:

$$\sin(a+) = \tan b \cos a + \sin a \quad (3)$$

$$\cos(a+) = \cos a - \tan b \sin a \quad (4)$$

the electrical analogs of the terms "sin $a$" and "cos $a$" in equations 3 and 4 being derived as voltages from the last stage of major significance and acting as inputs for the stages of minor significance, the electrical analog of the term "tan $b$" in equations 3 and 4 being first and second transformers for sine and cosine sections, respectively, said first and second transformers each having a primary winding common to all of the stages of minor significance in its section, said first and second transformers each having a secondary winding individual to each stage of its section, the secondary windings of the sine section being connected in series and each activated by a transistor circuit and supplying an output to a third transformer, the secondary windings of the cosine section being connected in series and each activated by a transistor circuit and supplying an output to a fourth transformer, said first and second transformers each having a turns ratio increasing its binary bit value in its respective secondary windings by a certain factor, said third and fourth transformers each decreasing its output by the same factor whereby in the sine section the signal proportional to "tan $b$ cos $a$" is restored to normal amplitude prior to being summed with the signal proportional to "sin $a$" to form the final sine output, and the signal in the cosine section proportional to "tan $b$ sin $a$" is restored to normal prior to being algebraically summed with the signal proportional to "cos $a$" to form the final cosine output.